US011862881B2

(12) United States Patent
Wang

(10) Patent No.: US 11,862,881 B2
(45) Date of Patent: Jan. 2, 2024

(54) ELECTRICAL CONNECTOR HAVING METALLIC SHELL WITH LOCKING ARMS AND ACTUATING ARMS FOR OPERATING THE LOCKING ARMS

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventor: Rui-Qin Wang, Kunshan (CN)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 72 days.

(21) Appl. No.: 17/718,502

(22) Filed: Apr. 12, 2022

(65) Prior Publication Data

US 2022/0328992 A1 Oct. 13, 2022

(30) Foreign Application Priority Data

Apr. 13, 2021 (CN) ......................... 202110395502.9

(51) Int. Cl.
*H01R 12/77* (2011.01)
*H01R 12/79* (2011.01)

(52) U.S. Cl.
CPC ........... *H01R 12/774* (2013.01); *H01R 12/79* (2013.01)

(58) Field of Classification Search
None
See application file for complete search history.

(56) References Cited

U.S. PATENT DOCUMENTS

| | | | | |
|---|---|---|---|---|
| 7,850,473 | B1 * | 12/2010 | Ozeki | H01R 12/79 439/260 |
| 8,002,567 | B2 * | 8/2011 | Hara | H01R 12/89 439/329 |
| 8,317,533 | B2 * | 11/2012 | Ishimaru | H01R 12/774 439/345 |
| 8,337,230 | B1 * | 12/2012 | Kurachi | H01R 12/774 439/328 |
| 8,371,880 | B2 * | 2/2013 | Ishimaru | H01R 12/774 439/632 |
| 8,608,509 | B2 * | 12/2013 | Shimada | H01R 12/774 439/607.01 |
| 8,851,918 | B2 * | 10/2014 | Yoshisuji | H01R 13/639 439/495 |
| 8,968,020 | B2 * | 3/2015 | Nishiyama | H01R 12/79 439/345 |
| 9,263,812 | B2 * | 2/2016 | Ishimaru | H01R 12/774 |

(Continued)

*Primary Examiner* — Ross N Gushi
(74) *Attorney, Agent, or Firm* — Ming Chieh Chang

(57) ABSTRACT

An electrical connector includes: an insulative housing having a slot; plural contacts secured in the insulative housing and exposed to the slot; and a metallic shell mounted to the insulative housing and having a top plate, a bottom plate, and a connecting part connected to the top plate at an upper end thereof and connected to the bottom plate at a lower end thereof, wherein the top plate has a pair of actuating arms and the connecting part has a pair of locking arms, and the top plate is movable about the upper end of the connecting part to actuate the pair of locking arms by the pair of actuating arms.

6 Claims, 9 Drawing Sheets

(56) References Cited

U.S. PATENT DOCUMENTS

| | | | | |
|---|---|---|---|---|
| 9,401,554 | B2 * | 7/2016 | Takane | H01R 12/771 |
| 10,164,364 | B2 * | 12/2018 | Asanuma | H01R 13/639 |
| 10,305,209 | B2 * | 5/2019 | Ishishita | H01R 12/774 |
| 10,530,082 | B2 * | 1/2020 | Motoyama | H01R 13/639 |
| 10,873,144 | B2 * | 12/2020 | Shimada | H01R 12/721 |
| 11,005,201 | B2 * | 5/2021 | Lin | H01R 13/6275 |
| 2015/0171536 | A1 * | 6/2015 | Kameda | H01R 12/774 439/329 |
| 2015/0270632 | A1 * | 9/2015 | Takane | H01R 12/716 439/78 |

* cited by examiner

ELECTRICAL CONNECTOR HAVING METALLIC SHELL WITH LOCKING ARMS AND ACTUATING ARMS FOR OPERATING THE LOCKING ARMS

BACKGROUND OF THE INVENTION

1. Field of the Invention

The present invention relates to an electrical connector for receiving a flat circuit device, comprising an insulative housing having a slot, a plurality of contacts secured in the insulative housing and exposed to the slot, and a metallic shell mounted to the insulative housing and having a top plate, wherein the top plate has a pair of actuating arms operable to actuate a corresponding pair of locking arms to release an inserted flat circuit device from a locked state.

2. Description of Related Art

U.S. Pat. No. 8,608,509 discloses an electrical connector for receiving a flat circuit device, such as a flexible printed circuit board (FPC) or a flexible flat cable assembly (FFC). The electrical connector comprises an insulative housing having a slot, a plurality of contacts secured in the insulative housing and exposed to the slot, and a metallic shell mounted to the insulative housing. The metallic shell has a top plate, a bottom plate, and a connecting part connected to the top plate and the bottom plate, wherein the top plate has a pair of locking arms operable to be released from an inserted FPC.

U.S. Pat. No. 10,530,082 discloses an electrical connector comprising an insulative housing having a slot, a plurality of contacts secured in the insulative housing and exposed to the slot, a metallic shell mounted to the insulative housing and including a top plate having a pair of actuating arms, and a pair of locking arms separately attached to the insulative housing, wherein the top plate is movable to actuate the pair of locking arms by the pair of actuating arms.

SUMMARY OF THE INVENTION

An electrical connector comprises: an insulative housing having a slot; a plurality of contacts secured in the insulative housing and exposed to the slot; and a metallic shell mounted to the insulative housing and having a top plate, a bottom plate, and a connecting part connected to the top plate at an upper end thereof and connected to the bottom plate at a lower end thereof; wherein the top plate has a pair of actuating arms and the connecting part has a pair of locking arms; and the top plate is movable about the upper end of the connecting part to actuate the pair of locking arms by the pair of actuating arms

DETAILED DESCRIPTION OF THE PREFERRED EMBODIMENT

Figure 1:
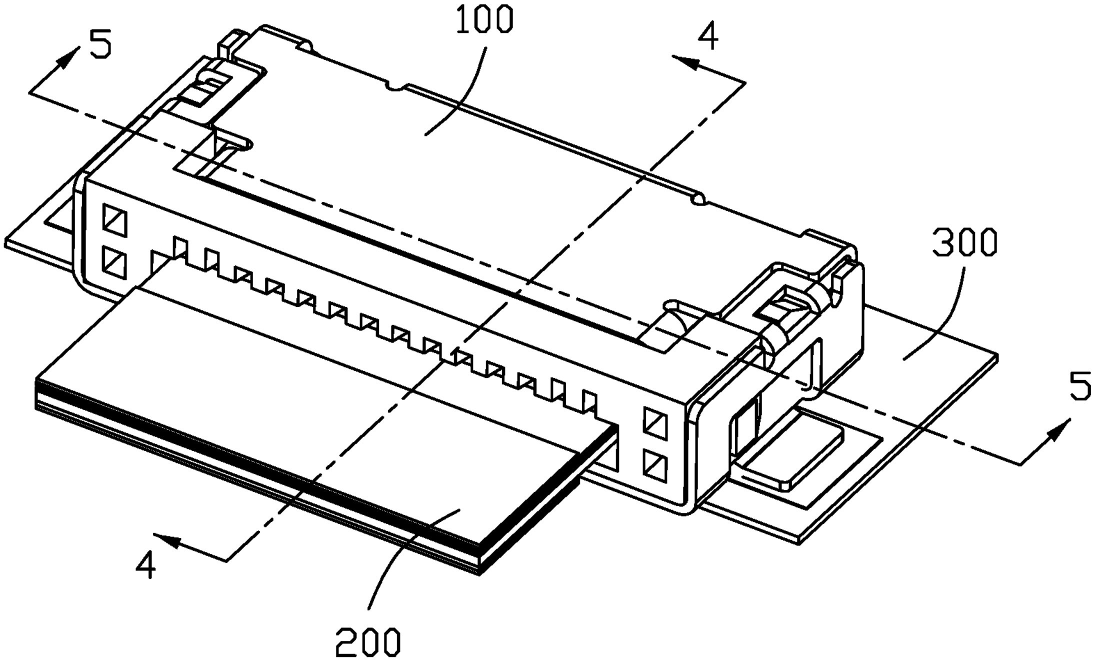
FIG. 1 is a perspective view of an electrical connector in accordance with the present invention mounted to a printed circuit board (PCB) and receiving an FPC.
Figure 2:
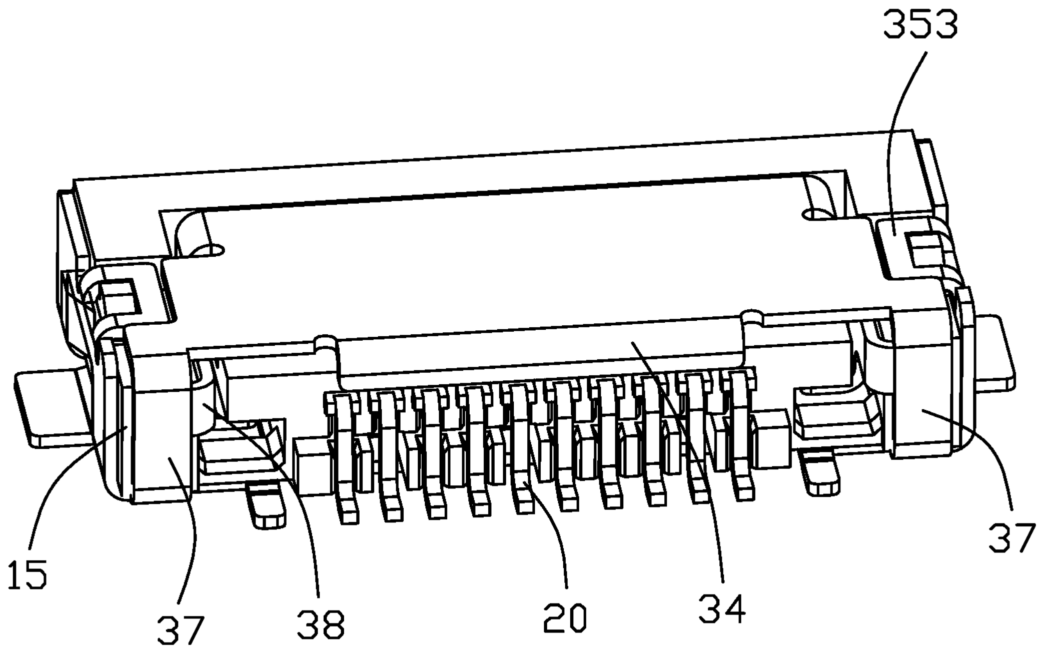
FIG. 2 is another perspective view of the electrical connector.
Figure 3:
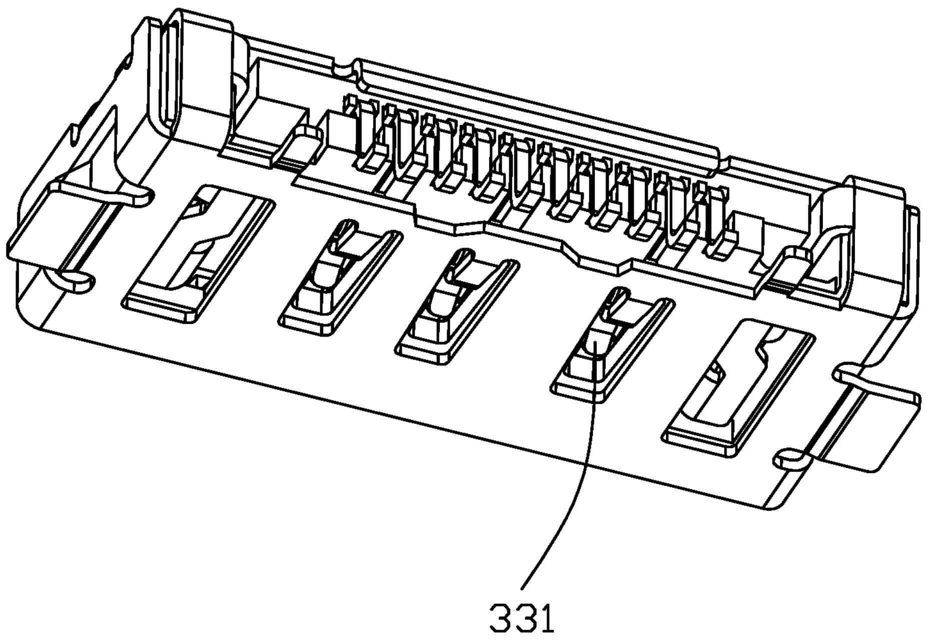
FIG. 3 is a further perspective view of the electrical connector.
Figure 4:
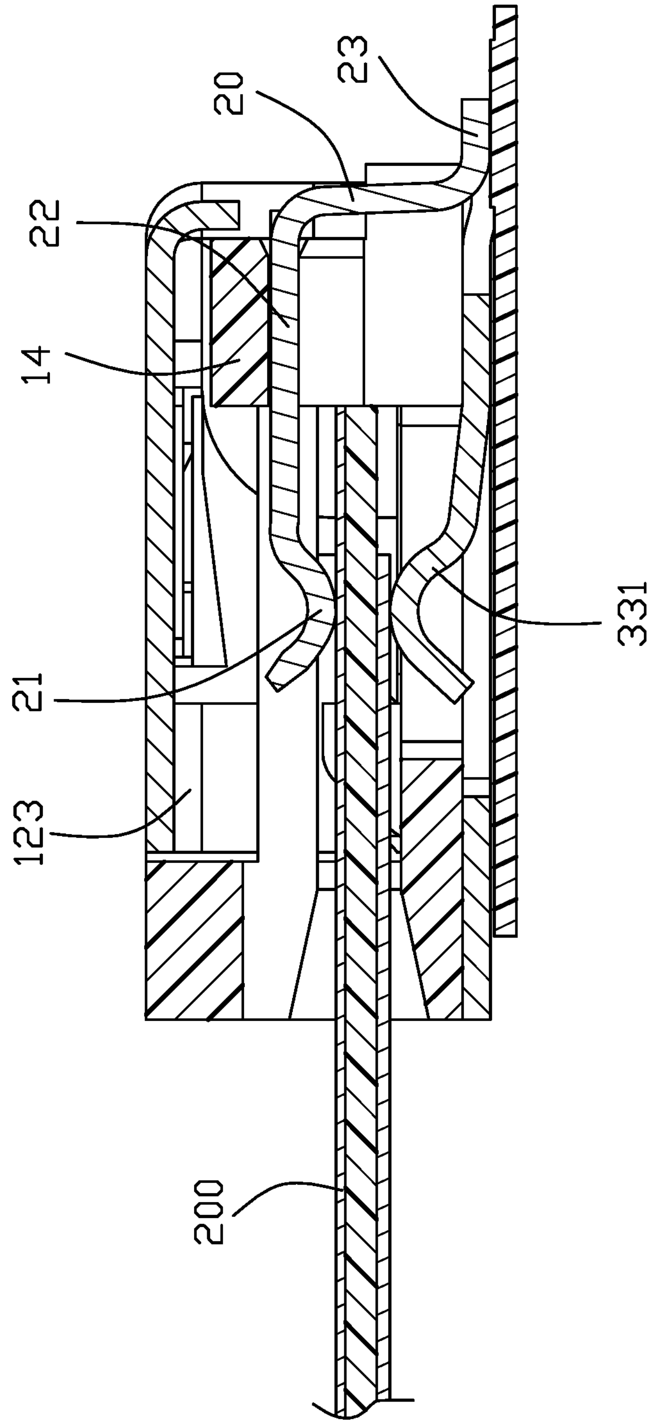
FIG. 4 is a cross-sectional view of the electrical connector together with the PCB and the FPC taken along line A-A in FIG. 1.
Figure 5:
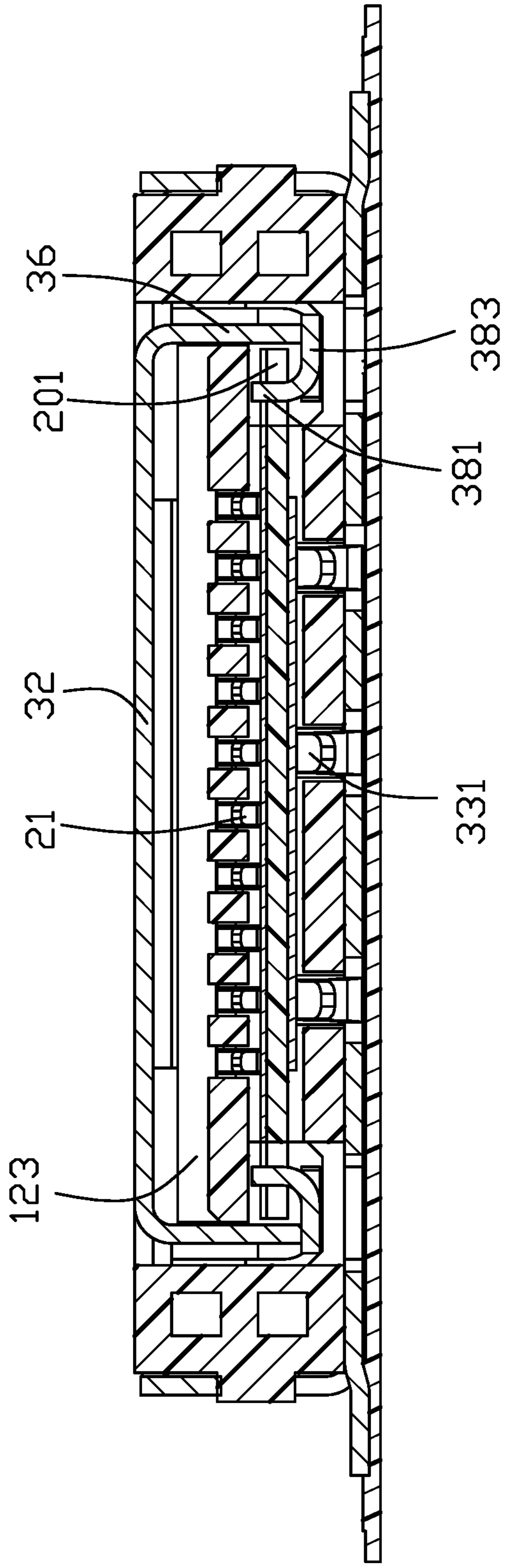
FIG. 5 is a cross-sectional view of the electrical connector together with the PCB taken along line B-B in FIG. 1.
Figure 6:
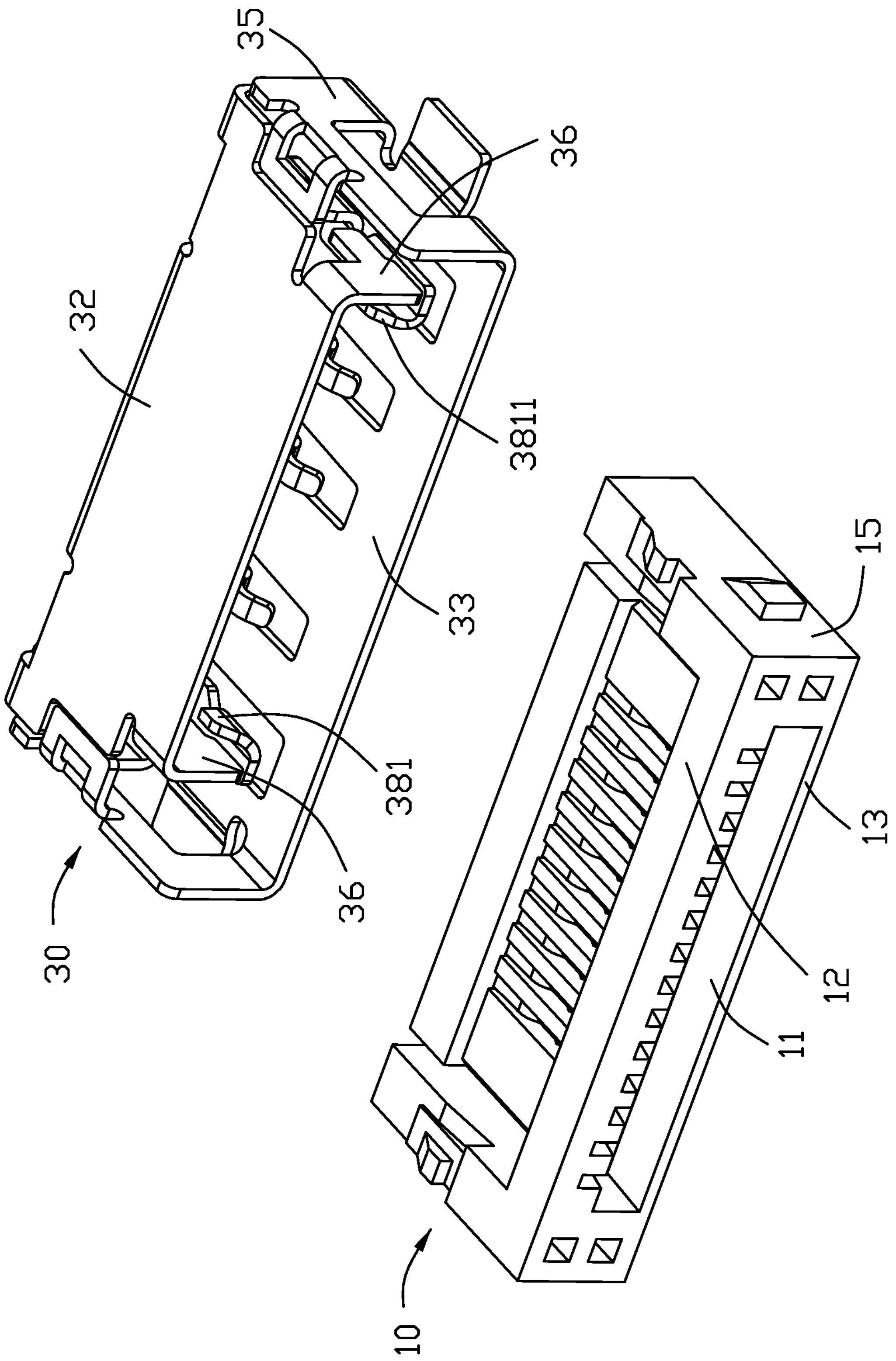
FIG. 6 is an exploded view of the electrical connector.
Figure 7:
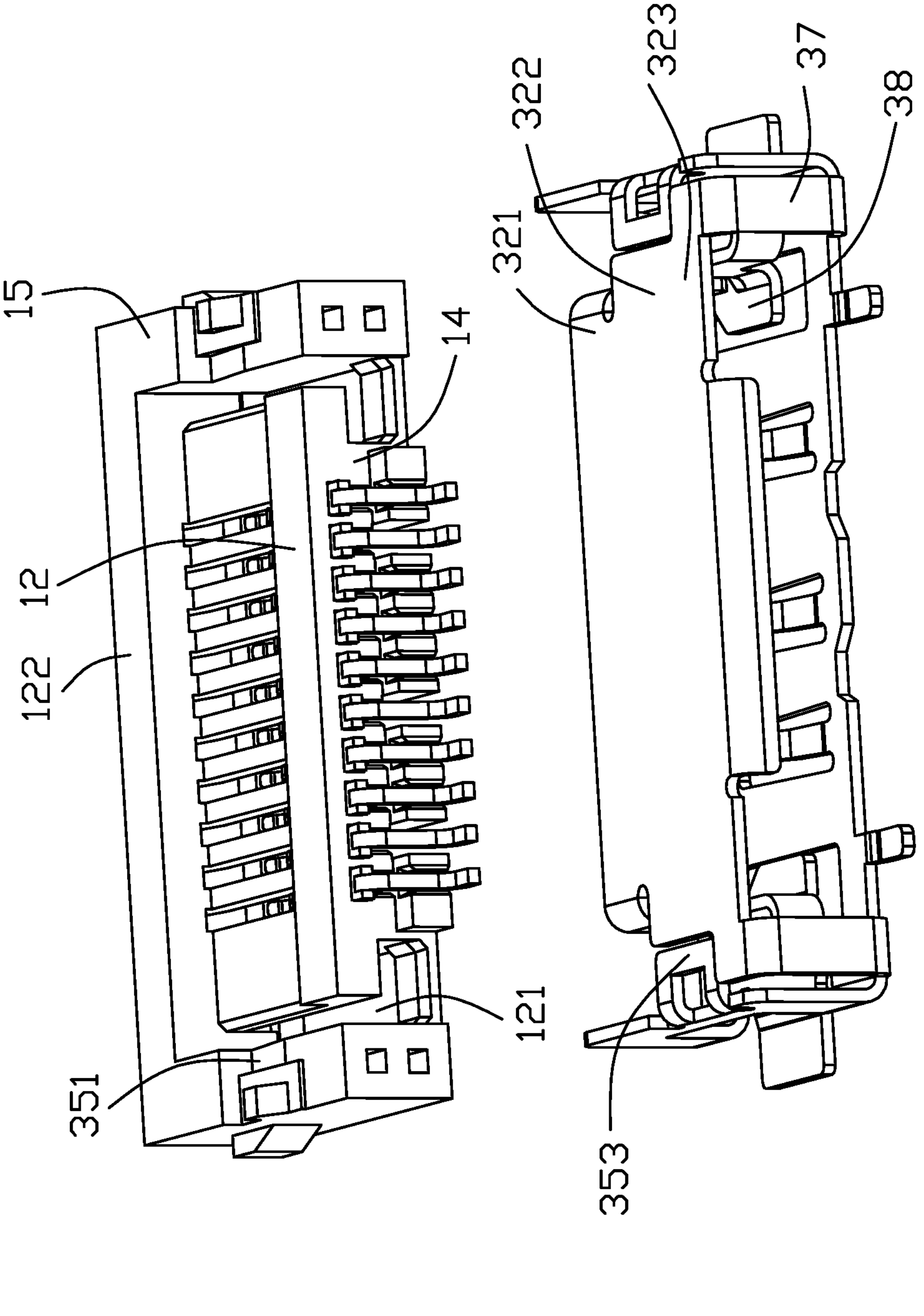
FIG. 7 is another exploded view of the electrical connector.
Figure 8:
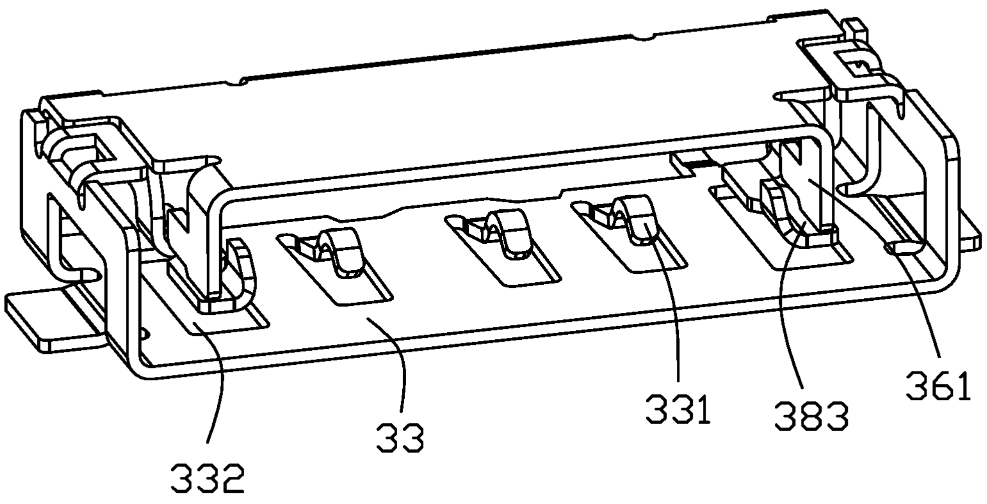
FIG. 8 is a perspective view of a metallic shell of the electrical connector.
Figure 9:
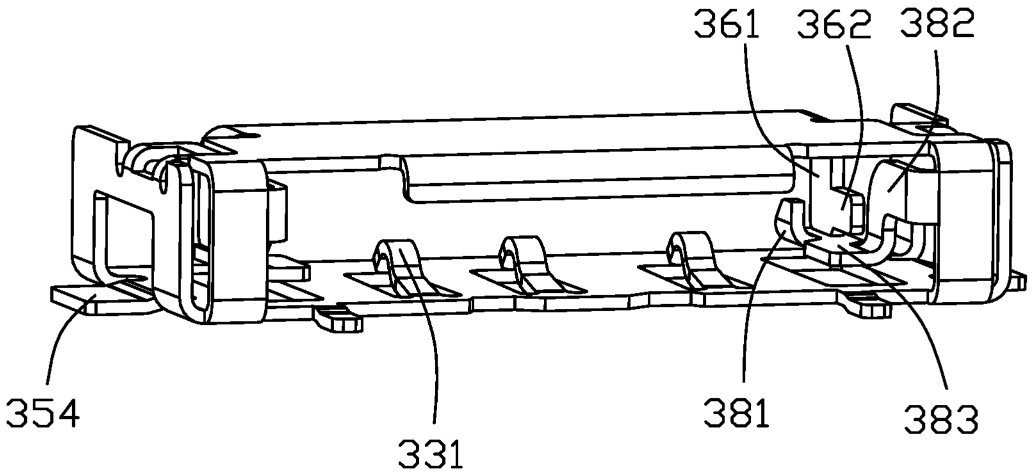
FIG. 9 is another perspective view of the metallic shell.

Referring to FIGS. 1-9, an electrical connector 100 is shown mounted to a PCB 300 for receiving an FPC 200 which has a pair of notches 201 (only one being labeled in FIG. 5). The electrical connector 100 includes an insulative housing 10 having a slot 11, a plurality of contacts 20 secured in the insulative housing 10 and exposed to the slot 11, and a metallic shell 30 mounted to the insulative housing 10. The insulative housing 10 has a top wall 12, a bottom wall 13, a rear wall 14, and a pair of side walls 15. Each contact 20 has a contacting potion 21, a tail 23, and a securing portion 22 therebetween and is adapted to engage the FPC 200 in a manner well known in this art.

The metallic shell 30 has a top plate 32, a bottom plate 33, and a connecting part 37 connected to the top plate 32 at an upper end thereof and connected to the bottom plate 33 at a lower end thereof. In the embodiment shown, the connecting part 37 is constructed as two separate pieces. The top plate 32 has a pair of actuating arms 36 and the connecting part 37 has a pair of corresponding locking arms 38. The locking arm 38 extends into the slot 11 and has a latch 381 for entering the notch 201 of the FPC 200. The top plate 32 is operable by a user to move about the upper end of the connecting part 37 so as to move the pair of actuating arms 36 downward to actuate the pair of locking arms 38, thereby disengaging the latches 381 from the notches 201 of the FPC 200. The FPC 200 then may be withdrawn from the electrical connector 100. After the operation, the top plate 32 and therefore the pair of actuating arms 36, as well as the pair of locking arms 38, will resiliently return to their original positions. The latch 381 has an inclined surface 3811 for the FPC 200 during inserting to pass over without hinderance or intervention.

As shown in FIG. 5, the pair of actuating arms 36 are in touch with the pair of locking arms 38 so that the latter is pre-loaded. This helps in controlling a movement of the pair of locking arms 38. The metallic shell 30 in the embodiment shown is of a one-piece construction.

The locking arm 38 has a vertical part 382 and a horizontal part 383; the horizontal part 383 contains the latch 381 at an inner end thereof. The actuating arm 36 is substantially vertical and includes a front part 361 and a rear part 362. The front part 361 has a bottom face that is in touch with the horizontal part 383 of the locking arm 38. A bottom face of the rear part 362 is leveled higher than the bottom face of the front part 361. The actuating arm 36 is located inwardly with respect to the vertical part 382 of the locking arm 38. The bottom plate 33 of the metallic shell 30 has a pair of openings 332 that align with the pair of locking arms 38 to accommodate for downward movements of the horizontal parts 383.

The metallic shell 30 may have a pair of side plates 35 that are bent upward from the bottom plate 33 but are separated from the top plate 32 so that the top plate 32 may have a downward movement independent of the pair of side plates 35.

Disposed between the top wall 12 and an associated side wall 15 is a respective channel 121 which is opening downwardly to the slot 11, passing upwardly through the top wall 12, and passing rearward through the rear wall 14, so as to receive a corresponding locking arm 38 and permit a resilient movement of the locking arm 38 therein. The channel 121 does not pass forwardly through the top wall 12 so that a front opening of the slot 11 has an uninterrupted frame structure 122. Behind this uninterrupted frame structure 122 is a cut-off portion providing a space 123 for movement of the top plate 32 when pressed downwardly. The top plate 32 includes a front portion 321, an intermediate portion 322, and a rear portion 323. Specifically, a respective upper portion of each side wall 15 has an inclined face 351 that aligns with the intermediate portion 322 to limit an over-downward movement of the top plate 32. The pair of actuating arms 36 are formed at two opposite side ends of the front portion 321.

Each of the side plates 35 of the metallic shell 30 has a clip 353 for latching to a protrusion disposed at the upper portion of the side wall 15. A similar latching structure is formed between a respective outer portion of the side wall 15 and the side plate 35. The bottom plate 33 has a plurality of spring fingers 331 to passing through the bottom wall 13 of the insulative housing 10 to contact a grounding structure of the FPC 200 and/or support the FPC 200. The metallic shell 30 may further have a rear plate 34 that bears against the rear wall 14 of the insulative housing 10 and a pair of mounting flaps 354.

What is claimed is:

1. An electrical connector comprising:

an insulative housing having a slot;

a plurality of contacts secured in the insulative housing and exposed to the slot; and a metallic shell mounted to the insulative housing and having a top plate, a bottom plate, and a connecting part connected to the top plate at an upper end thereof and connected to the bottom plate at a lower end thereof; wherein the top plate has a pair of actuating arms and the connecting part has a pair of locking arms; and the top plate is movable about the upper end of the connecting part to actuate the pair of locking arms by the pair of actuating arms.

2. The electrical connector as claimed in claim 1, wherein the pair of actuating arms are in touch with the pair of locking arms.

3. The electrical connector as claimed in claim 1, wherein the metallic shell is of a one-piece construction.

4. The electrical connector as claimed in claim 1, wherein the bottom plate of the metallic shell has a pair of openings each aligned with a corresponding locking arm.

5. The electrical connector as claimed in claim 1, wherein the insulative housing comprises a pair of side walls each having an inclined face to limit an over-downward movement of the top plate.

6. The electrical connector as claimed in claim 1, wherein the metallic shell comprises a pair of side plates separated from the top plate and secured to the insulative housing.

* * * * *